(12) United States Patent
Baptista

(10) Patent No.: US 6,933,470 B2
(45) Date of Patent: Aug. 23, 2005

(54) INCREMENTAL SEAL WIRE ACTIVATION

(75) Inventor: Alexandre A. N. Baptista, Dublin, CA (US)

(73) Assignee: Tilia International, Inc., San Francisco, CA (US)

( * ) Notice: Subject to any disclaimer, the term of this patent is extended or adjusted under 35 U.S.C. 154(b) by 0 days.

(21) Appl. No.: 10/628,028

(22) Filed: Jul. 24, 2003

(65) Prior Publication Data

US 2005/0016983 A1 Jan. 27, 2005

(51) Int. Cl.⁷ ................................................ H05B 3/02
(52) U.S. Cl. ..................... 219/243; 219/221; 338/92; 338/97
(58) Field of Search ................................ 219/243, 221, 219/541, 477, 480; 156/499; 200/500, 501, 82 R; 377/12; 338/200, 154, 155, 157, 92, 96, 97, 202, DIG. 1

(56) References Cited

U.S. PATENT DOCUMENTS

| | | | | |
|---|---|---|---|---|
| 1,143,579 A | * | 6/1915 | Denhard | 219/480 |
| 2,749,686 A | * | 6/1956 | Lorenz et al. | 53/434 |
| 2,899,786 A | * | 5/1959 | Harker | 53/564 |
| 3,038,283 A | * | 6/1962 | Unger | 53/542 |
| 3,148,269 A | * | 9/1964 | Van Hartesveldt et al. | 219/243 |
| 4,549,387 A | * | 10/1985 | Marshall et al. | 53/469 |
| 4,631,512 A | * | 12/1986 | Hishiki et al. | 338/97 |
| 4,641,482 A | * | 2/1987 | Metz | 219/243 |
| 5,352,323 A | * | 10/1994 | Chi | 219/243 |
| 5,712,553 A | * | 1/1998 | Hallberg | 307/75 |
| 5,825,974 A | * | 10/1998 | Hutton et al. | 219/480 |
| 6,124,558 A | * | 9/2000 | Baumeister et al. | 200/501 |

* cited by examiner

Primary Examiner—Teresa J. Walberg
(74) Attorney, Agent, or Firm—Perkins Coie LLP

(57) ABSTRACT

A method and apparatus for incremental seal wire activation, in one embodiment, is a method of sealing a seam of a bag. The method includes sealing a first side of the seam utilizing a first configuration. The method farther includes vacuuming gases from the bag. The method also includes sensing a vacuum condition responsive to vacuuming the bag. The method further includes shifting to a second configuration. The method also includes sealing a second side of the seam utilizing the second configuration.

78 Claims, 9 Drawing Sheets

INCREMENTAL SEAL WIRE ACTIVATION

FIELD

The present invention relates to the field of heating circuitry. More particularly, the present invention relates to heat sealing of plastic for consumer and industrial applications.

BACKGROUND

Consumer products involving vacuuming and sealing plastic bags have grown in popularity over the years. The basic model available includes a seal wire which seals the length of the bag and a vacuum pump which pumps air out of the bag prior to sealing. This model works well enough to have sold and inspired imitation.

Unfortunately, the model described requires use of expensive components and still suffers from air bubbles in some vacuum-sealed packages. In particular, the seal wire used to seal the plastic is heated throughout its entire length at one time, requiring a high current for activation, and a correspondingly big and expensive transformer. Moreover, the larger the area to be heated, the longer the heating process is likely to take. Similarly, the vacuum must be maintained over a wide physical area (the length of the bag) and may increase the time needed to seal to any cold air flowing over the area to be sealed.

Transformers in particular are well-known as expensive components, and their cost increases in a nonlinear fashion, such that a first transformer with twice the capacity of a second transformer may cost much more than twice the price of the second transformer. Similarly, the bigger the cross-section through which vacuum must be maintained, the larger (and more costly) the pump must be to maintain that vacuum.

Accordingly, it may be preferable to implement a system in which relatively low-cost components may be used to ease the requirements for a large transformer and a large vacuum pump.

SUMMARY

An apparatus and method for incremental seal wire activation or incremental sealing in a sealing unit is described and illustrated. In various embodiments, the invention typically includes a method of vacuum-sealing an item such as a plastic bag by sealing a first portion of the bag, vacuuming the bag, and sealing a second portion of the bag under vacuum. The first portion and second portion may have some overlap, such that a part of the bag sealed as part of the first portion may undergo further sealing activity as part of the second portion. Moreover, the sizes and relative locations of the first portion and second portion may be adjustable.

Alternately, the invention typically includes a first selective electrical connection useful for electrifying a first portion of a heat-sealing strip, a second selective electrical connection useful for electrifying a second portion of a heat-sealing strip, a vacuum pump, and a controller which controls the other components. The controller may be a simple mechanical controller or an integrated circuit for example.

In one embodiment, the invention is an apparatus using a first voltage terminal and a second voltage terminal. The apparatus includes a first electrode coupled to the first voltage terminal. The apparatus also includes a second electrode coupled to the second voltage terminal. The apparatus further includes a heating strip having a first end and a second end, the first end coupled to the first voltage terminal, and the second end coupled to the second voltage terminal. The first electrode is selectively connectable to the heating strip at a first intermediate contact, with the first intermediate contact of the heating strip disposed between the first end and the second end. The second electrode is selectively connectable to the heating strip at a second intermediate contact, with the second intermediate contact of the heating strip disposed between the first intermediate contact and the second end.

In an alternate embodiment, the invention is a method of sealing a seam of a bag. The method includes sealing a first side of the seam utilizing a first configuration. The method further includes vacuuming gases from the bag. The method also includes sensing a vacuum condition responsive to vacuuming the bag. The method further includes shifting to a second configuration. The method also includes sealing a second side of the seam utilizing the second configuration.

DETAILED DESCRIPTION

Figure 1A:
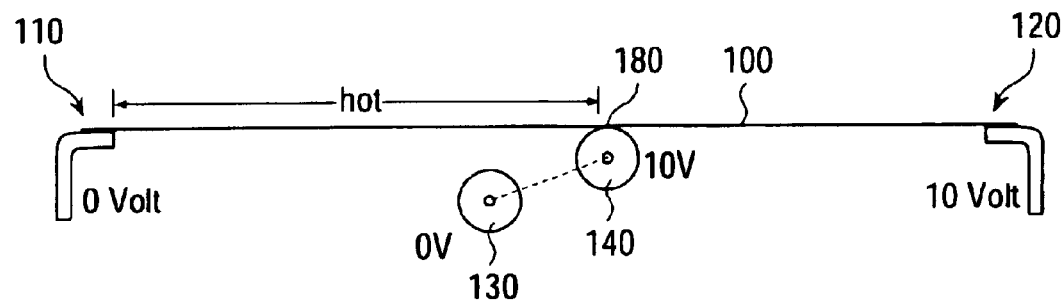
FIG. 1A illustrates an embodiment of an apparatus for incremental sealing in a first configuration.

An apparatus and method for incremental seal wire activation or incremental sealing in a sealing unit is described and illustrated. The apparatus and method may be used to activate a first portion of a seal wire, then to activate a second portion of a seal wire thereby allowing for fully sealing a plastic bag or other similar container.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

In various embodiments, the invention typically includes a method of vacuum-sealing an item such as a plastic bag by sealing a first portion of the bag, vacuuming the bag, and sealing a second portion of the bag under vacuum. The first portion and second portion may have some overlap, such that a part of the bag sealed as part of the first portion may undergo further sealing activity as part of the second portion. Moreover, the sizes and relative locations of the first portion and second portion may be adjustable.

Alternately, the invention typically includes a first selective electrical connection useful for electrifying a first portion of a heat-sealing strip, a second selective electrical connection useful for electrifying a second portion of a heat-sealing strip, a vacuum pump, and a controller which controls the other components. The controller may be a simple mechanical controller or an integrated circuit for example.

In one embodiment, the invention is an apparatus using a first voltage terminal and a second voltage terminal. The apparatus includes a first electrode coupled to the first voltage terminal. The apparatus also includes a second electrode coupled to the second voltage terminal. The apparatus further includes a heating strip having a first end and a second end, the first end coupled to the first voltage terminal, and the second end coupled to the second voltage terminal. The first electrode is selectively connectable to the heating strip at a first intermediate contact, with the first intermediate contact of the heating strip disposed between the first end and the second end. The second electrode is selectively connectable to the heating strip at a second intermediate contact, with the second intermediate contact of the heating strip disposed between the first intermediate contact and the second end.

In an alternate embodiment, the invention is a method of sealing a seam of a bag. The method includes sealing a first side of the seam utilizing a first configuration. The method further includes vacuuming gases from the bag. The method also includes sensing a vacuum condition responsive to vacuuming the bag. The method further includes shifting to a second configuration. The method also includes sealing a second side of the seam utilizing the second configuration.

In one embodiment the method of incremental sealing involves first activating a first portion of a seal wire, then vacuuming ambient air out of an associated plastic bag, then activating the second portion of the seal wire. In an alternate embodiment an apparatus for incremental sealing includes a first electrode and a second electrode both of which are selectively connected to a heating strip and further includes the heating strip which is at one end coupled to a first voltage terminal and at the second end coupled to a second voltage terminal. The first electrode is selectively connectable to the heating strip at a first intermediate contact. The first intermediate contact of the heating strip is disposed between the first end and the second end. The second electrode is also selectively connectable to the heating strip at a second intermediate contact. The second intermediate contact of the heating strip is disposed between the first intermediate contact and the second end. The present invention provides for the opportunity to seal a first part of the bag, then vacuum out the atmosphere, thereby, potentially achieving a more effective vacuum, and then seal the second part of the bag under vacuum. The present invention potentially allows for use of a smaller or a less current consuming transformer and for use of less maximum current to activate sealing of the plastic bag that is typically used with these devices.

Figure 1B:
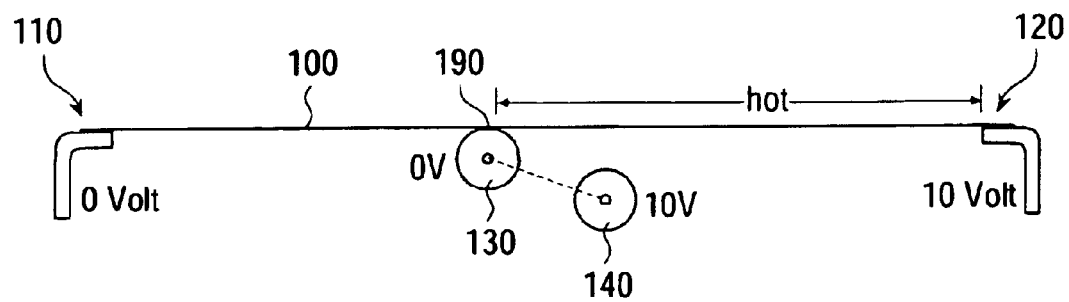
FIG. 1B illustrates an embodiment of an apparatus for incremental sealing in a second configuration.

As is illustrated in FIGS. 1A and 1B, one embodiment of the apparatus may have a first configuration and a second configuration. The first configuration is illustrated in FIG. 1A. Sealing wire 100 has coupled at one end a 0 volt power terminal at point 110 and at another end a 10 volt power terminal at point 120. The 0 volt and 10 volt power terminals may be two terminals of a single power source or supply, for example, and the specific magnitudes of the voltages are exemplary and illustrative of a specific design choice rather than a requirement of the invention.

At an intermediate point 180 electrode 140 is selectively connected to the sealing wire 100. Electrode 140 is set at 10 volts, through coupling to the 10 volt power terminal. As a result, the portion of sealing wire 100 between point 110 and intermediate point 180 is hot whereas the portion of sealing wire 100 between intermediate point 180 and point 120 is left relatively unheated due to the lack of voltage differential between those two points. Electrode 130 is set at 0 volts and is illustrated as disconnected from sealing wire 100.

Turning to FIG. 1B, intermediate point 190 illustrates the connection point where electrode 130 is selectively connected to sealing wire 100. This generates a hot zone between intermediate point 190 and point 120 due to the voltage differential between those two points. The area between point 110 and intermediate point 190 is left unheated. Note that intermediate points 180 and 190 may be referred to as voltage reception points, where a predetermined voltage is applied to a component such as sealing wire 100.

Figure 2:
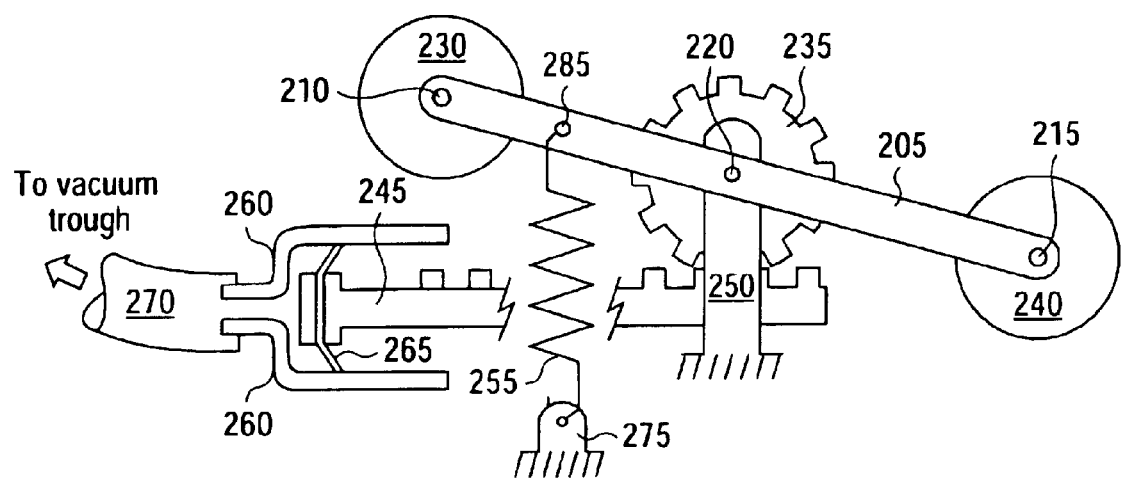
FIG. 2 illustrates an embodiment of an apparatus for incremental sealing in schematic form.

The embodiment illustrated in FIGS. 1A and 1B may be implemented as part of a larger embodiment illustrated in FIG. 2. The embodiment of an apparatus for incremental sealing illustrated in FIG. 2 includes the two electrodes as described and further includes a mechanism for switching from having one electrode connected to having the electrode connected and a mechanism for sensing whether vacuum is present in the associated vacuum trough of a typical sealing apparatus. Electrode 230 is coupled to swing arm 205 via fastener 210 at one end (or a first end) of swing arm 205. At a second end of swing arm 205 is electrode 240, which is coupled to swing arm 205 through fastener 215. At the midpoint of swing arm 205 pinion 220 is inserted in a through hole of swing arm 205. Pinion 220 passes through mounting bracket 250 and on the other side is connected to gear 235, such that when gear 235 turns, swing arm 205 rotates and each of electrodes 230 and 240 are moved.

Gear 235 meshes with the teeth of plunger 245. The first end of plunger 245 includes rubber-sealing ring 265, both of which are inserted into housing 260. Housing 260 may be an annular housing with a large opening on a first end in which the first end of plunger 245 is inserted and a narrow opening on a second end to which hose 270 is connected. Hose 270 is also connected to the vacuum trough of the associated apparatus. Thus, when vacuum is present in the vacuum trough of the associated apparatus, suction through hose 270 draws plunger 245 further into housing 260, thus turning gear 235. Moreover, when air fills the vacuum of the associated vacuum trough, this eases suction against plunger 245, allowing swing arm 205 to return to its normal position. At through hole 285, spring 255 is connected to swing arm 205 and spring 255 is also connected to receptacle 275, which is an attachment on the housing of the associated apparatus. The tension in spring 255 naturally will cause swing arm 205 to return to a position where electrode 240 is in contact with the associated sealing wire absent an opposing force (such as the vacuum pulling plunger 245).

In some embodiments, it may be useful to control the amount of time during which heating occurs. This can be achieved in a variety of ways. For example, a thermistor or other heat sensing component may be employed to determine when a seal wire or nearby component has reached a predetermined temperature. This determination may either signal heating is complete or that a timer should be started to allow for fusing at a predetermined temperature for a predetermined amount of time. In alternate embodiments, a timer may be employed to cause heating of a sealing strip for a predetermined amount of time without monitoring of an associated temperature. In other alternate embodiments, a microcontroller may implement timing functions or similar functions and processes for control of heating. Moreover, in yet other alternate embodiments, user activation (such as by pushing or pushing and holding a button for example) may be used to initiate and maintain heating.

Figure 3A:
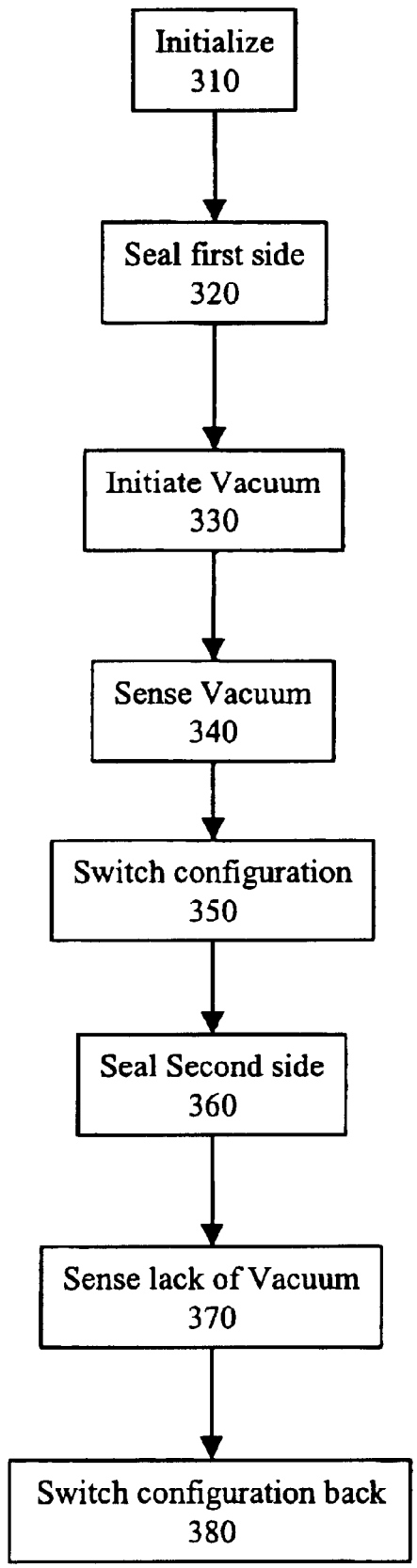
FIG. 3A illustrates an embodiment of a method of incremental sealing.

While the apparatuses illustrated in FIGS. 1A, 1B and 2 can be used for incremental sealing the method of sealing incrementally may also be utilized. FIG. 3A illustrates one embodiment of a method of incremental sealing. At block 310 the process is initialized typically by using a first configuration or first state in which a portion of the sealing may occur. At block 320 the first side of the object is sealed. At block 330 vacuum is induced, pulling air out of whatever object is to be sealed. At block 340 this vacuum is sensed. At block 350 responsive to sensing vacuum, a configuration switch occurs such that a second configuration or state is used. At block 360 in the second configuration the second side of the object to be sealed is sealed under vacuum. At block 370 the absence of vacuum is sensed (after the vacuum is filled) and at block 380 the apparatus in question switches back to its original configuration or state.

Figure 3B:
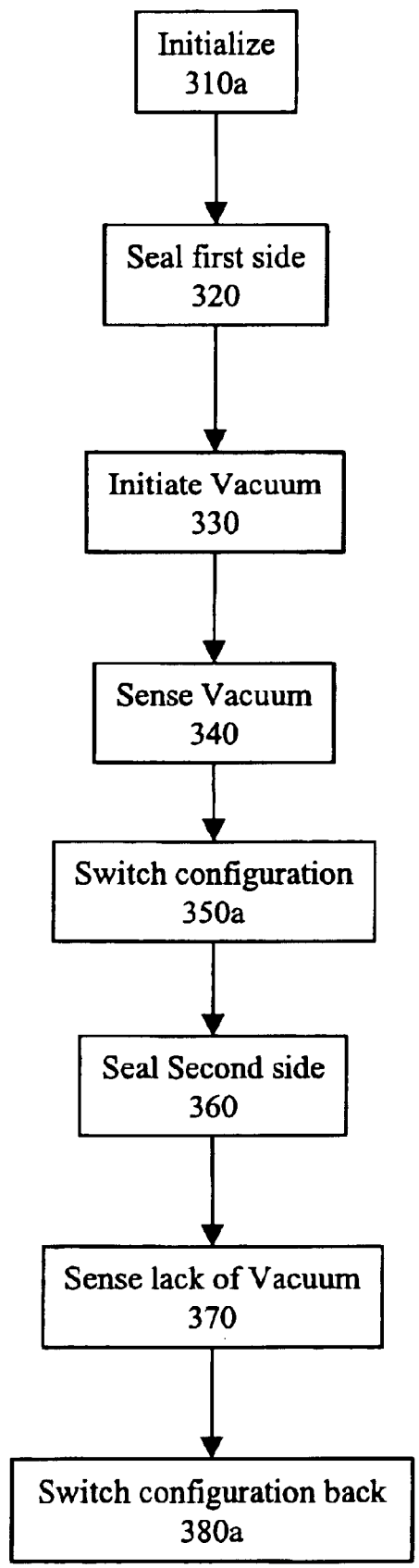
FIG. 3B illustrates an embodiment of one method of incremental sealing.

This method may be further understood with reference to specific embodiments of the method. For example the embodiment of FIG. 3B is related to utilization of shifting electrodes. At block 310a the process is initialized and a first configuration or first state of the apparatus in question is used, with a first electrode connected and a second electrode disconnected. At block 320 the left side of the material to be sealed is sealed. At block 330 vacuum is induced. At block 340 the induced vacuum of block 330 is sensed. At block 350a the electrodes are switched from the first configuration to the second configuration, with the first electrode disconnected and the second electrode connected. As a result at block 360 the right side of the material to be sealed is sealed. At block 370 the absence of vacuum is then sensed and at block 380a the configuration is switched back to the original or first configuration.

Figure 3C:
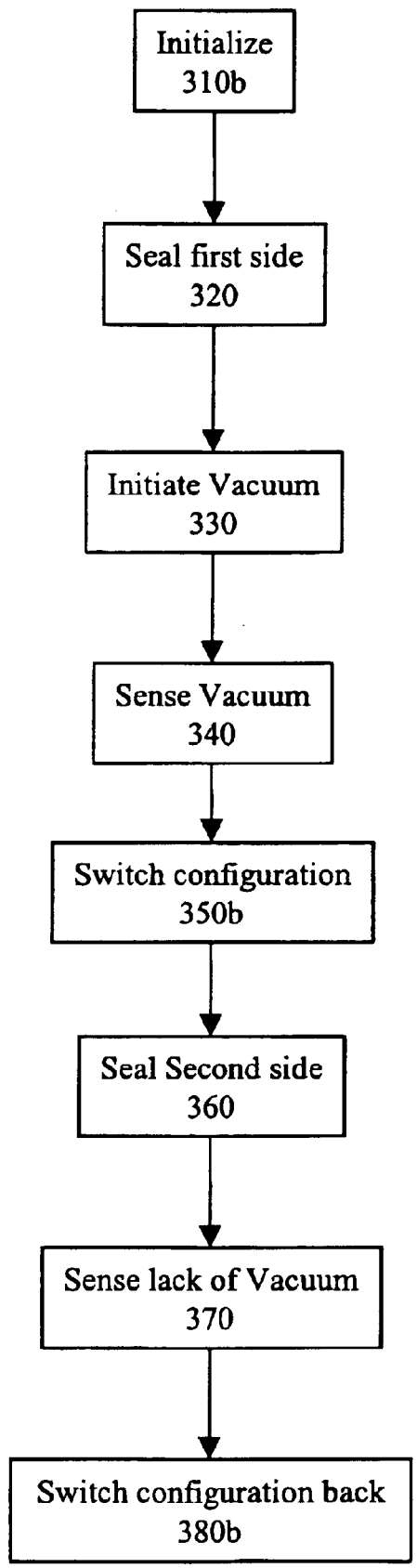
FIG. 3C illustrates an alternative embodiment of a method of incremental sealing.

Similarly, FIG. 3C illustrates a method related to use of switches. At block 310b the method is initialized typically with a first switch closed and a second switch open in what may be referred to as a first configuration. At block 320 the left side is sealed utilizing current passing through the first switch. At block 330 vacuum is switched on. At block 340 the vacuum of block 330 is sensed. At block 350b a change in configurations occurs, such that switch one is switched off and then switch two is switched on in a break-before-make type of transition. At block 360 the right side is then sealed. At block 370 the lack of vacuum is then sensed and at block 380b the method switches back to the first configuration where switch two is off and switch one is on. As indicated with respect to FIG. 3C alternate embodiments of the apparatus may be used.

Figure 4:
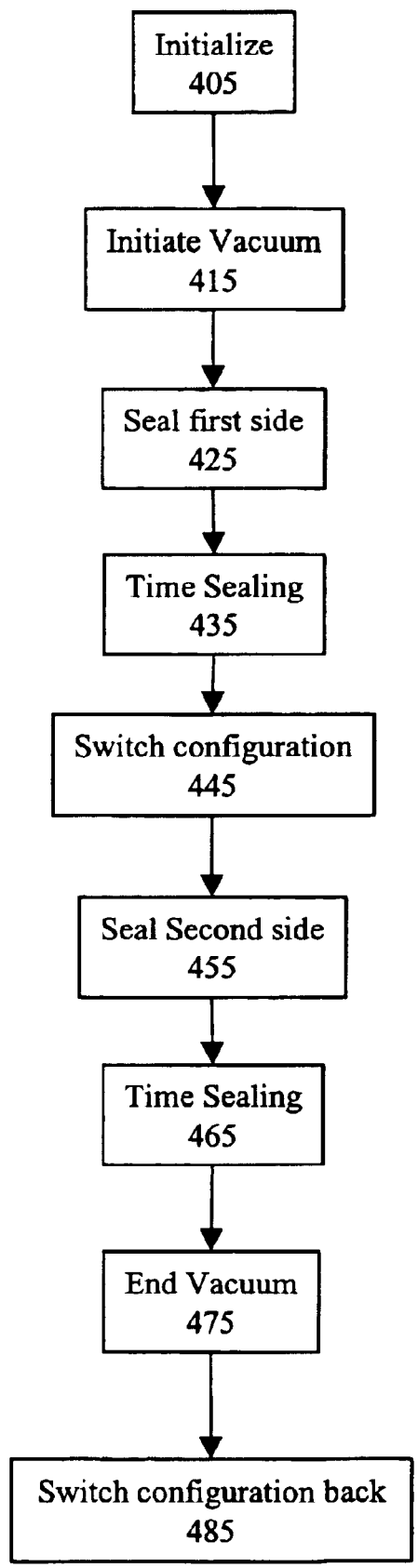
FIG. 4 illustrates another alternative embodiment of a method of incremental sealing.

Still another alternate embodiment of a method may be employed. FIG. 4 illustrates an alternate embodiment of a method of incremental seal activation. In the method illustrated, all sealing occurs under vacuum conditions, and the sealing processes are timed based on predetermined time limits. At block 405, the process is initialized, with associated sealing apparatus in a first configuration or state. At block 415, vacuum is initiated or pumped down. At block 425, sealing of a first side or first portion of an object to be sealed is commenced. At block 435, the sealing of block 425 is timed until a predetermined time limit is reached. Block 435, in various alternate embodiments, may be replaced with a sensing block wherein deactivation of a seal command (pushbutton for example) from a user is sensed, or with a sensing block wherein a temperature is sensed, resulting in either termination of the sealing or timing of the sealing to a predetermined time limit.

At block 445, the method includes switching from the first configuration or state to a second configuration or state. At block 455, sealing of the second side or portion (using the second configuration or state) initiates. At block 465, the sealing of block 455 is timed until a predetermined time limit is reached. Block 465 is susceptible to alternative implementations in a similar manner to block 435. At block 475, vacuum pumping stops, after the heating process is expected to have achieved its goals. At block 485, the method involves switching back to an original or first configuration or state.

Figure 5A:
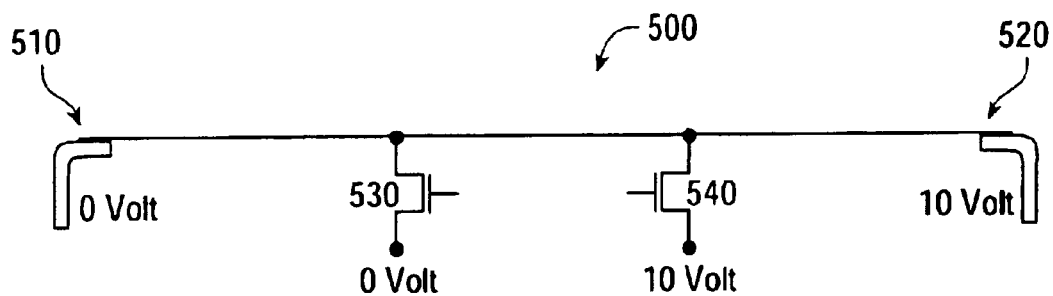
FIG. 5A illustrates an alternate embodiment of an apparatus for incremental sealing.

In FIG. 5A, an alternate embodiment using power MOSFETS is illustrated. Seal wire 500 has a 0 volt connection at endpoint 510 and at a second endpoint 520 a 10 volt connection. Switch 530 is a power MOSFET which is coupled to a 0 volt potential, thereby allowing selective connection of that 0 volt potential to an intermediate point of seal wire 500. Similarly, switch 540 is connected to a second intermediate point of seal wire 500 and is coupled to a 10 volt potential terminal, thereby allowing for a selective connection of that 10 volt potential to an intermediate point of seal wire 500.

Figure 5B:
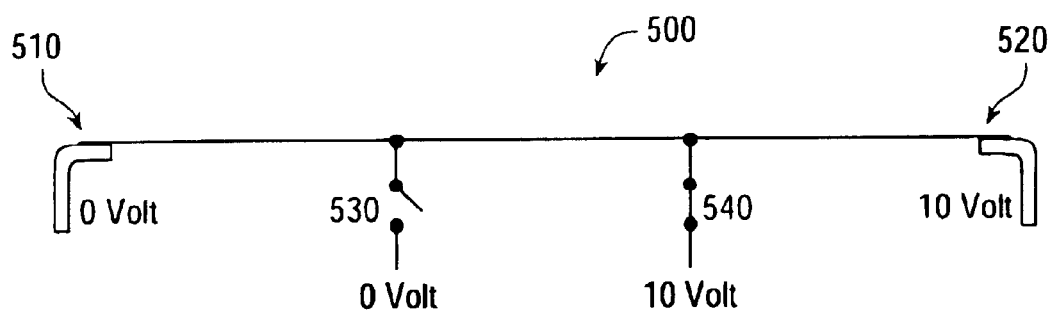
FIG. 5B illustrates the alternate embodiment of an apparatus for incremental sealing in a first configuration.

FIG. 5B illustrates a first configuration of the alternate embodiment of an apparatus such as that of FIG. 5A. In this instance, switch 540 is closed thereby connecting or allowing the 10 volt potential to be present at the first intermediate point of seal wire 500. Switch 530 is open, thereby allowing for selective connection or disconnection with the 0 volt potential at the second intermediate point of seal wire 500.

Figure 5C:
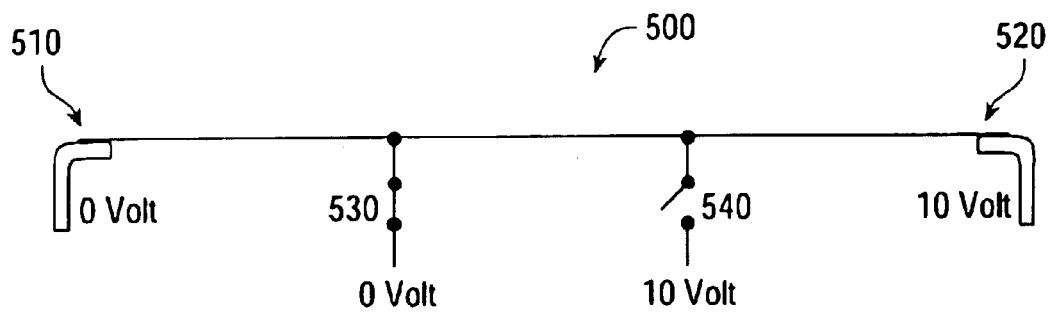
FIG. 5C illustrates the alternate embodiment of an apparatus for incremental sealing in a second configuration.

Similarly, FIG. 5C illustrates the second configuration of the alternate embodiment in which switch 530 is closed and switch 540 is open thereby allowing for connection of the 0 volt potential to seal wire 500 at the second intermediate point and selective disconnection of the 10 volt potential.

Figure 6:
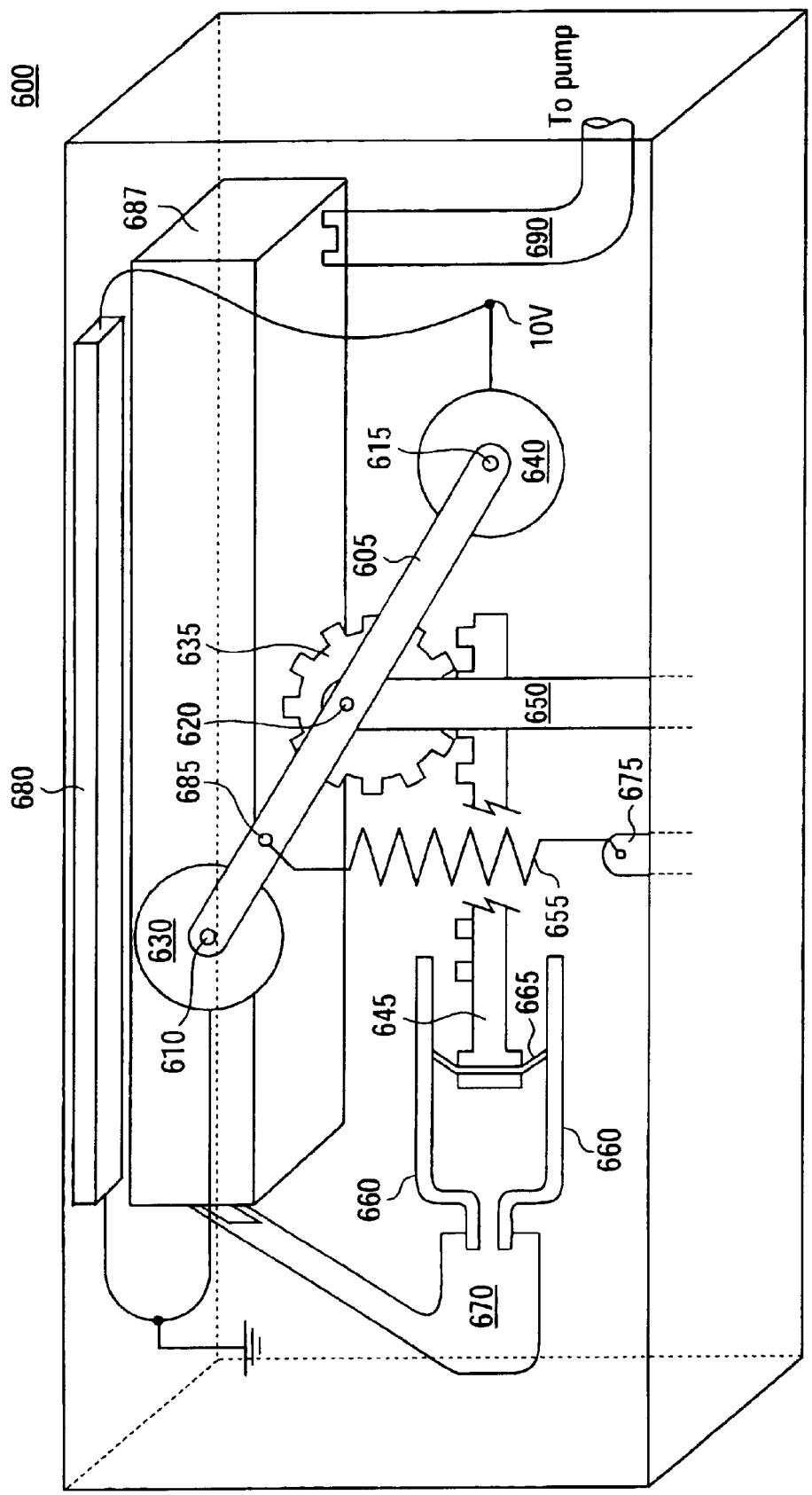
FIG. 6 illustrates an overall apparatus including an embodiment of an apparatus for incremental sealing.

Turning to FIG. 6, an overall system or apparatus in which various embodiments of the invention may be used is illustrated. In particular, FIG. 6 illustrates the original first apparatus embodiment in a larger system. Apparatus 600 includes the embodiment of FIG. 1 or a similar embodiment along with additional components. Swing arm 605 is coupled at one end through pinion 610 to electrode 630 and at a second end through pinion 615 to electrode 640. A pinion at roughly the center point of swing arm 605, pinion 620, goes through a through hole and supports 650 to gear 635. Support 650 is directly connected to the interior wall of a chamber within device 600 in which all of this material is housed. Thus, gear 635, swing arm 605 and electrodes 630 and 640 are all supported from device 600. Moreover, when gear 635 rotates, swing arm 605 also rotates. Also connected to swing arm 605 at through hole 685 is spring 655, which is further connected to receptacle 675 of device 600. Spring 655 effectively causes tension to hold in place swing arm 605 in a first configuration.

Meshed with teeth of gear 635 are teeth of plunger 645. Plunger 645 also has an annular disk 665 such as a rubber ring, both of which are inserted into housing 660 thus providing a relatively sealed connection thereto. Housing 660 has a first end into which plunger 645 is inserted and a second end around which tube 670 is affixed. Tube 670 is further affixed to a first receptacle of vacuum trough 687. Vacuum trough 687 has a second receptacle to which is affixed a second tube 690 which goes to a vacuum pump. Thus, when the pump pumps down to vacuum through tube 690, vacuum trough 687 then effectively pumps air out of tube 670 and plunger 645 is pulled toward the interior of housing 660 thus, causing gear 635 to rotate. When the vacuum is filled in vacuum trough 687, plunger 645 then is naturally moved away by the tension in spring 655 and the resulting rotation of swing arm 605 and gear 635 resets to the first configuration. All of this results in at most one of electrodes 630 and 640 connecting to seal wire 650 at any given time. One end of seal wire 650 is connected to a ground potential, as is electrode 630. The second end of seal wire 650 is connected to a 10 volt potential, as is electrode 640.

Figure 7:
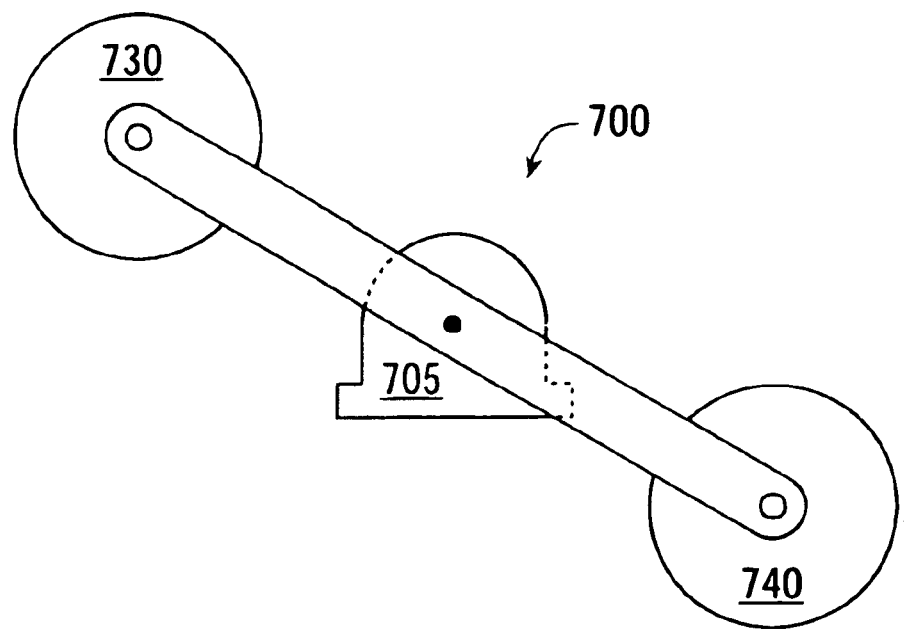
FIG. 7 illustrates yet another alternative embodiment of an apparatus for incremental sealing.

Turning to FIG. 7, yet another alternate embodiment of an incremental seal wire apparatus is illustrated. Swing arm 700 is coupled at one end to electrode 730 through a pinion and at another end to electrode 740 through another pinion. At a middle point swing arm 700 is coupled through yet another pinion or axle to stepper motor 705. Stepper motor 705 may then be activated to turn swing arm 700 the appropriate fractional number of steps to switch from a first configuration with electrode 730 connected to a seal wire, to a second configuration with electrode 740 connected to the seal wire.

From the foregoing, it will be appreciated that specific embodiments of the invention have been described herein for purposes of illustration, but that various modifications may be made without deviating from the spirit and scope of the invention. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention. Similarly, methods have been illustrated and described as linear processes, but such methods may have operations reordered or implemented in parallel within the spirit and scope of the invention. Accordingly, the invention is not limited except as by the appended claims.

I claim:

1. An apparatus using a first voltage terminal and a second voltage terminal, comprising:
   a first electrode coupled to the first voltage terminal;
   a second electrode coupled to the second voltage terminal;
   a heating strip having a first end and a second end, the first end coupled to the first voltage terminal, the second end coupled to the second voltage terminal;
   wherein the first electrode is selectively connectable to the heating strip at a first intermediate contact, the first intermediate contact of the heating strip disposed between the first end and the second end; and
   wherein the second electrode is selectively connectable to the heating strip at a second intermediate contact, the second intermediate contact of the heating strip disposed between the first intermediate contact and the second end.

2. The apparatus of claim 1, further comprising:
   a swing arm having a first end and a second end, the first end of the swing arm connected to the first electrode, the second end of the swing arm connected to the second electrode.

3. The apparatus of claim 2, further comprising:
   a stepper motor coupled to a midpoint of the swing arm.

4. The apparatus of claim 2, further comprising:
   a gear coupled to the swing arm at a midpoint of the swing arm.

5. The apparatus of claim 4, further comprising:
   a plunger having a set of teeth on a first side of the plunger, teeth of the set of teeth enmeshed with teeth of the gear.

6. The apparatus of claim 5, further comprising:
   a housing surrounding a first end of the plunger, the housing having a first opening and a second opening, the plunger extending out of the first opening, the second opening coupled to a vacuum trough.

7. The apparatus of claim 6, further comprising:
   a pinion connected to a center of the gear at a first end of the pinion, the pinion further connected to the midpoint of the swing arm at a second end of the pinion; and
   a mounting arm having a hole, the pinion inserted in the whole, the mounting arm disposed between the gear and the swing arm.

8. The apparatus of claim 7, further comprising:
   a weight coupled to the swing arm at a point of the swing arm between the first end of the swing arm and the midpoint of the swing arm.

9. The apparatus of claim 8, further comprising:
   a spring disposed between the swing arm and the weight.

10. The apparatus of claim 7, further comprising:
    a container housing having therein a chamber, the chamber including the gear, the pinion, the plunger, the swing arm, the first electrode and the second electrode, the container housing having a receptacle on an interior wall of the container housing; and
    a spring connected to the swing arm at a point of the swing arm between the first end of the swing arm and the midpoint of the swing arm, the spring further connected to the receptable of the container housing.

11. The apparatus of claim 10, wherein:
    the first voltage terminal provides a zero volt potential and the second voltage terminal provides a ten volt potential.

12. The apparatus of claim 1, wherein:
    the first voltage terminal provides a zero volt potential and the second voltage terminal provides a ten volt potential.

13. The apparatus of claim 1, further comprising:
    a first switch connected to the first electrode and connected to the first intermediate contact, the first switch disposed between the first electrode and the first intermediate contact; and
    a second switch connected to the second electrode and connected to the second intermediate contact, the second switch disposed between the second electrode and the second intermediate contact.

14. The apparatus of claim 13, further comprising:
    a controller coupled to a control terminal of the first switch and coupled to a control terminal of the second switch.

15. The apparatus of claim 14, further comprising:
    a vacuum sensor coupled to the controller.

16. The apparatus of claim 10, further comprising:
    a vacuum pump coupled to the vacuum trough;

a controller coupled to the vacuum pump; and
a thermistor coupled to the controller.
17. The apparatus of claim 10, further comprising:
a vacuum pump coupled to the vacuum trough; and
a timing circuit coupled to the vacuum pump.
18. The apparatus of claim 5, further comprising:
a manually operated control coupled to the plunger.
19. The apparatus of claim 10, further comprising:
a transformer coupled to the first voltage terminal and the second voltage terminal; and
a manually operated control coupled to the transformer.
20. The apparatus of claim 15, further comprising:
a thermal sensor coupled to the controller and coupled to the heating strip.
21. The apparatus of claim 15, further comprising:
a timing circuit coupled to the controller.
22. The apparatus of claim 14, further comprising:
a manually operated activation component coupled to the controller.
23. The apparatus of claim 15, further comprising:
a timer embodied in the controller.
24. The apparatus of claim 23, further comprising:
an oscillator coupled to the controller.
25. A method of sealing a seam of a bag, comprising:
sealing a first side of the seam utilizing a first configuration;
vacuuming gases from the bag;
sensing a vacuum condition responsive to the vacuuming the bag;
shifting to a second configuration; and
sealing a second side of the seam utilizing the second configuration.
26. The method of claim 25, further comprising:
sensing a non-vacuum condition; and
shifting from the second configuration to the first configuration.
27. The method of claim 26, further comprising:
initializing in the first configuration.
28. The method of claim 26, wherein:
the first side is a left side; and the second side is a right side.
29. The method of claim 26, wherein:
shifting to the second configuration includes disconnecting a first electrode from a seal wire and connecting a second electrode to the seal wire.
30. The method of claim 26, wherein:
shifting to the second configuration includes decoupling a first electrode from a seal wire and coupling a second electrode to the seal wire.
31. The method of claim 30, wherein:
shifting to the first configuration includes coupling a first electrode to the seal wire and decoupling a second electrode from the seal wire.
32. The method of claim 29, wherein:
shifting to the first configuration includes connecting a first electrode to the seal wire and disconnecting a second electrode from the seal wire.
33. The method of claim 32, wherein:
shifting to the first configuration includes moving a plunger responsive to the vacuum condition, and rotating a gear coupled to the plunger, the gear further coupled to the first electrode and the second electrode.
34. The method of claim 33, wherein:
shifting to the second configuration includes rotating the gear responsive to the non-vacuum condition and moving the plunger.
35. The method of claim 25, further comprising:
timing the sealing the first side, the vacuuming occuring responsive to the timing.
36. The method of claim 35, further comprising:
timing the sealing the second side; and
stopping the sealing the second side responsive to the timing.
37. The method of claim 25, further comprising:
sensing a temperature associated with sealing the first side; and
the vacuuming occuring responsive to the sensing.
38. The method of claim 25, further comprising:
sensing a temperature associated with sealing the first side.
39. The method of claim 25, wherein:
the method progresses responsive to manually generated control signals.
40. The method of claim 25, wherein:
shifting to the second configuration occurs responsive to a manually generated control signal.
41. An apparatus, comprising:
means for sealing a first portion of a plastic bag and a second portion of a plastic bag;
first means for activating the means for sealing for the first portion;
second means for activating the means for scaling for the second portion; and
means for switching between the first means for activating and the second means for activating.
42. An apparatus for sealing a plastic bag, comprising:
a power source having a high voltage terminal and a low voltage terminal;
a container housing having therein a chamber, the power source disposed within the chamber, the container housing further having a vacuum channel, the vacuum channel having a first receptacle and a second receptable;
a vacuum pump disposed within the chamber;
a tube having a first end connected to the vacuum pump and a second end connected to the first receptacle of the vacuum channel;
a first electrode coupled to the low voltage terminal;
a second electrode coupled to the high voltage terminal;
a heating strip mounted on a surface of the container housing, the heating strip having a first end and a second end, the first end coupled to the low voltage terminal, the second end coupled to the high voltage terminal;
wherein the first electrode is selectively connectable to the heating strip at a first intermediate contact, the first intermediate contact of the heating strip disposed between the first end and the second end; and
wherein the second electrode is selectively connectable to the heating strip at a second intermediate contact, the second intermediate contact of the heating strip disposed between the first intermediate contact and the second end.
43. The apparatus of claim 42, further comprising:
a swing arm having a first end and a second end, the first end of the swing arm connected to the first electrode, the second end of the swing arm connected to the second electrode.

44. The apparatus of claim 43, further comprising:

a gear coupled to the swing arm at a midpoint of the swing arm.

45. The apparatus of claim 44, further comprising:

a plunger having a set of teeth on a first side of the plunger, teeth of the set of teeth enmeshed with teeth of the gear.

46. The apparatus of claim 45, further comprising:

a housing surrounding a first end of the plunger, the housing having a first opening and a second opening, the plunger extending out of the first opening, the second opening coupled to the second receptacle of the vacuum channel.

47. The apparatus of claim 46, further comprising:

a pinion connected to a center of the gear at a first end of the pinion, the pinion further connected to the midpoint of the swing arm at a second end of the pinion; and a mounting arm having a hole, the pinion inserted in the whole, the mounting arm disposed between the gear and the swing arm, the mounting arm mounted on an inner surface of the chamber of the container housing.

48. The apparatus of claim 47, further comprising:

a spring connected to the swing arm at a point of the swing arm between the first end of the swing arm and the midpoint of the swing arm, the spring further connected to a receptable of the chamber.

49. The apparatus of claim 42, wherein:

the low voltage terminal provides a zero volt potential and the high voltage terminal provides a ten volt potential.

50. The apparatus of claim 48, wherein:

the low voltage terminal provides a zero volt potential and the high voltage terminal provides a ten volt potential.

51. The apparatus of claim 42, further comprising:

a first switch connected to the first electrode and connected to the first intermediate contact, the first switch disposed between the first electrode and the first intermediate contact; and a second switch connected to the second electrode and connected to the second intermediate contact, the second switch disposed between the second electrode and the second intermediate contact.

52. The apparatus of claim 51, further comprising:

a controller coupled to a control terminal of the first switch and coupled to a control terminal of the second switch.

53. The apparatus of claim 52, further comprising:

a vacuum sensor coupled to the controller, the vacuum sensor coupled to the second receptacle of the vacuum channel.

54. The apparatus of claim 42, wherein:

the power source is a transformer.

55. The apparatus of claim 53, wherein:

the power source is a transformer.

56. The apparatus of claim 55, wherein:

the controller is coupled to the vacuum pump; and further comprising:

an oscillator coupled to the controller.

57. In a packaging machine, an apparatus for selective application of electric voltage to a first voltage reception point and a second voltage reception point, using a first voltage terminal and a second voltage terminal, comprising:

a first electrode coupled to the first voltage terminal;

a second electrode coupled to the second voltage terminal;

wherein the first electrode is selectively connectable to the first voltage reception point; and wherein the second electrode is selectively connectable to the second voltage reception point.

58. The apparatus of claim 57, wherein:

the first voltage reception point and the second voltage reception point are located at intermediate locations of a sealing strip.

59. The apparatus of claim 57, further comprising:

a swing arm having a first end and a second end, the first end of the swing arm connected to the first electrode, the second end of the swing arm connected to the second electrode.

60. The apparatus of claim 59, further comprising:

a gear coupled to the swing arm at a midpoint of the swing arm.

61. The apparatus of claim 60, further comprising:

a plunger having a set of teeth on a first side of the plunger, teeth of the set of teeth enmeshed with teeth of the gear.

62. The apparatus of claim 61, further comprising:

a housing surrounding a first end of the plunger, the housing having a first opening and a second opening, the plunger extending out of the first opening, the second opening coupled to a vacuum trough.

63. The apparatus of claim 62, further comprising:

a pinion connected to a center of the gear at a first end of the pinion, the pinion further connected to the midpoint of the swing arm at a second end of the pinion; and a mounting arm having a hole, the pinion inserted in the whole, the mounting arm disposed between the gear and the swing arm.

64. The apparatus of claim 63, further comprising:

a container housing having therein a chamber, the chamber including the gear, the pinion, the plunger, the swing arm, the first electrode and the second electrode, the container housing having a receptacle on an interior wall of the container housing; and a spring connected to the swing arm at a point of the swing arm between the first end of the swing arm and the midpoint of the swing arm, the spring further connected to the receptable of the container housing.

65. The apparatus of claim 64, wherein:

the first voltage terminal provides a zero volt potential and the second voltage terminal provides a ten volt potential.

66. The apparatus of claim 57, wherein:

the first voltage terminal provides a zero volt potential and the second voltage terminal provides a ten volt potential.

67. The apparatus of claim 57, further comprising:

a first switch connected to the first electrode and connected to the first voltage reception point, the first switch disposed between the first electrode and the first voltage reception point; and a second switch connected to the second electrode and connected to the second voltage reception point, the second switch disposed between the second electrode and the second voltage reception point.

68. The apparatus of claim 67, further comprising:

a controller coupled to a control terminal of the first switch and coupled to a control terminal of the second switch.

69. A method of sealing a seam of a bag, comprising:

vacuuming gases from the bag;

sealing a first portion of the seam utilizing a first configuration after material to be enclosed has been placed in the bag;

shifting to a second configuration; and sealing a second portion of the seam utilizing the second configuration.

70. The method of claim 69, further comprising:

sensing a non-vacuum condition; and shifting from the second configuration to the first configuration.

71. The method of claim 70, further comprising:

initializing in the first configuration.

72. The method of claim 71, wherein:

the first portion is a left side; and the second portion is a right side.

73. The method of claim 71, wherein:

shifting to the second configuration includes disconnecting a first electrode from a seal wire and connecting a second electrode to the seal wire.

74. The method of claim 71, wherein:

shifting to the second configuration includes decoupling a first electrode from a seal wire and coupling a second electrode to the seal wire.

75. The method of claim 74, wherein:

shifting to the first configuration includes coupling a first electrode to the seal wire and decoupling a second electrode from the seal wire.

76. The method of claim 73, wherein:

shifting to the first configuration includes connecting a first electrode to the seal wire and disconnecting a second electrode from the seal wire.

77. The method of claim 76, wherein:

shifting to the second configuration further includes timing the sealing the first side until a first predetermined time limit is reached.

78. The method of claim 77, wherein:

shifting to the first configuration further includes timing the sealing the second side until a second predetermined time limit is reached.

* * * * *